(12) United States Patent
Jain et al.

(10) Patent No.: US 9,348,892 B2
(45) Date of Patent: May 24, 2016

(54) NATURAL LANGUAGE INTERFACE FOR FACETED SEARCH/ANALYSIS OF SEMISTRUCTURED DATA

(75) Inventors: Anshu N. Jain, Karnataka (IN); Krishna Kummamuru, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 458 days.

(21) Appl. No.: 12/694,762

(22) Filed: Jan. 27, 2010

(65) Prior Publication Data

US 2011/0184942 A1  Jul. 28, 2011

(51) Int. Cl.
  *G06F 17/30* (2006.01)

(52) U.S. Cl.
  CPC .... *G06F 17/30643* (2013.01); *G06F 17/30663* (2013.01)

(58) Field of Classification Search
  CPC .............. G06F 17/30643; G06F 17/30663
  USPC ................................ 707/763, 708; 715/708
  See application file for complete search history.

(56) References Cited

U.S. PATENT DOCUMENTS

| | | | |
|---|---|---|---|
| 5,454,106 A * | 9/1995 | Burns et al. | |
| 6,564,202 B1 | 5/2003 | Schuetze et al. | |
| 6,778,193 B2 | 8/2004 | Biebesheimer et al. | |
| 7,146,362 B2 | 12/2006 | Allen et al. | |
| 7,519,580 B2 | 4/2009 | Blackwell | |
| 2003/0055837 A1* | 3/2003 | Brobst et al. | 707/102 |
| 2007/0136221 A1 | 6/2007 | Sweeney et al. | |
| 2008/0140617 A1 | 6/2008 | Torres et al. | |
| 2008/0189264 A1 | 8/2008 | Cochran | |
| 2008/0235199 A1* | 9/2008 | Li et al. | 707/4 |
| 2008/0243778 A1 | 10/2008 | Behnen et al. | |
| 2008/0306928 A1 | 12/2008 | Brunner et al. | |
| 2009/0106224 A1* | 4/2009 | Roulland et al. | 707/5 |
| 2009/0138435 A1 | 5/2009 | Halberstadt et al. | |
| 2009/0259954 A1 | 10/2009 | Chenthamarakshan et al. | |

OTHER PUBLICATIONS

Hearst, Marti A, "UI's for Faceted Navigation: Recent Advances and Remaining Open Problems," Workshop on Computer Interaction and Information Retrieval, HCIR 2008, (Oct. 2008).*
Hsu et al. (WO 01/90953).*
Capra, Robert; Marchionini, Gary, Faceted Browsing, Dynamic Interfaces, and Exploratory Search: Experiences and Challenges, School of Information and Library Science, University of North Carolina at Chapel Hill.
Tomoko, Kajiyama, "GUI for Integrating Multi-Faceted Search and Browsing", Journal of Joho Shori Gakkai Kenkyu Hokoku, ISSN: 0919-6072, vol. 2004, No. 115, p. 71-78.

(Continued)

*Primary Examiner* — Scott A Waldron
*Assistant Examiner* — Bruce Witzenburg
(74) *Attorney, Agent, or Firm* — Ference & Associates LLC

(57) ABSTRACT

Embodiments of the invention broadly contemplate systems, methods, apparatuses and program products providing a faceted search tool enabling a user to enter a natural language query that contains representative terms the user wants to search for, and a convenient interface display in which the facets which contain the searched values are automatically resolved and presented.

13 Claims, 6 Drawing Sheets

(56) References Cited

OTHER PUBLICATIONS

Kando, Noriko; Kanazawa, Teruhito; Miyazawa, Akira, Retrieval of Web Resources Using a Fusion of Ontology-based and Content-based Retrieval with the RS Vector Space Model on a Portal for Japanese Universities and Academic Institutes, Proceedings of the 39th Hawaii International Conference on System Sciences—2006.

Muller, Wolfgang; Zech, Markus; Henrich; Andreas, "VisualFlamenco: Faceted Browsing for Visual Features", Ninth IEEE International Symposium on Multimedia 2007—Workshops.

Capra, Robert G.; Marchionini, "The Relation Browser Tool for Faceted Exploratory Search", JCDL '08, Jun. 16-20, 2008, Pittsburgh, Pennsylvania.

Sinha, Vineet; Karger, David R., "Magnet: Supporting Navigation in Semistructured Data Environments", SIGMOD 2005, Jun. 14-16, 2005, Baltimore, Maryland, USA.

* cited by examiner

Option 1:
65 → 12 → 1

| Severity | Category | Group Parent |
|---|---|---|
| ☐ | ☐ | ☐ |
| ☐ Normal = 12191 | ☐ HW_Server = 32 | ☐ IBM = 6 |
| ☐ High = 275 | ■ MA_SAP = 12 | ☐ Accenture = 4 |
| ☐ Medium = 147 | ☐ SW_Inter/Intranet = 4 | ☐ Diageo-Apps Suppt = 1 |
| ■ Critical = 65 | ☐ SW_Business Apps = 3 | ■ CSC-Apps Suppt = 1 |
| ☐ pokok = 2 | ☐ SW_Workstation OS = 2 | |

Option 2:
415 → 21 → 1

| Group Parent | Category | Severity |
|---|---|---|
| ☐ | ☐ | ☐ |
| ☐ IBM = 9770 | ☐ SW_Business Apps = 3 | ☐ Normal = 17 |
| ☐ Diageo-Business = 812 | ☐ SW_Database_Oracle = 66 | ☐ High = 2 |
| ☐ Accenture = 670 | ☐ SW_MIS = 60 | ☐ Medium = 1 |
| ☐ (Blanks) = 522 | ☐ SW_Manugistics = 47 | ■ Critical = 1 |
| ☐ Diageo-Apps Sppt. = 470 | ☐ SW_Siebel = 39 | |
| ■ CSC-Apps Sppt. = 415 | ■ MA_SAP = 12 | |

Option 3:
1161 → 21 → 1

| Category | Group Parent | Severity |
|---|---|---|
| ☐ | ☐ | ☐ |
| ☐ HW_Server = 1680 | ☐ IBM = 581 | ☐ Normal = 17 |
| ■ MA_SAP = 1161 | ☐ Accenture = 483 | ☐ High = 2 |
| ☐ SW_Mail = 1008 | ☐ Diageo-Business = 361 | ■ Medium = 1 |
| ☐ SW_Business Apps = 956 | ■ CSC-Apps Suppt = 21 | ☐ Critical = 1 |
| ☐ MA_Concur = 733 | ☐ Diageo-Apps Suppt = 19 | |

NATURAL LANGUAGE INTERFACE FOR FACETED SEARCH/ANALYSIS OF SEMISTRUCTURED DATA

BACKGROUND

The subject matter described herein generally relates to faceted search tools for searching semi-structured data stored in one or more computer databases. Faceted search (navigation or browsing) is a technique for accessing a collection of information represented using a faceted classification. This allows users to explore by filtering. Faceted classification systems allow assignment of classifications, enabling the classifications to be ordered in multiple ways, rather than in a single, pre-determined order. Each facet typically corresponds to the possible values of a property/attribute common to a set of objects.

Given faceted search/analysis over multiple attributes, the user interaction conventionally involves selecting one or more values from a list of possible values of a facet as calculated by the selection of other facets. This interactive behavior involves responding to selection of a facet value from one of many values that the user interface shows the user, based on the user's previous facet selections. Some non-limiting examples of conventional faceted search tools include faceted search tools developed by the University of California at Berkley (the Flamenco Search Interface Project) and the University of North Carolina at Chapel Hill (the Relation Browser tool for faceted search).

BRIEF SUMMARY

Embodiments of the invention broadly contemplate systems, methods, apparatuses and program products providing a faceted search tool supporting natural language queries. Embodiments of the invention enable entering a natural language query that contains representative terms the user wants to search for, and the facets which contain the searched values are automatically resolved and presented to the user. Thus, embodiments of the invention provide for automated and assisted facet selection in response to a natural language query, facilitating more user friendly and accurate searches of faceted data.

In summary, one aspect of the invention provides an apparatus comprising: one or more processors; and a computer readable storage medium having computer readable program code embodied therewith and executable by the one or more processors, the computer readable program code comprising: computer readable program code configured to parse an input natural language query; computer readable program code configured to interpret the natural language query to an underlying order of one or more facets; computer readable program code configured to select one or more relevant combinations of facets in response to the natural language query; and computer readable program code configured to organize and output a display of one or more of the one or more relevant combinations of facets necessary to obtain one or more desired records corresponding to the natural language query.

Another aspect of the invention provides a method comprising: parsing an input natural language query; interpreting the natural language query to an underlying order of one or more facets; selecting one or more relevant combinations of facets in response to the natural language query; and organizing and outputting a display of one or more of the one or more relevant combinations of facets necessary to obtain one or more desired records corresponding to the natural language query.

A further aspect of the invention provides a computer program product comprising: a computer readable storage medium having computer readable program code embodied therewith, the computer readable program code comprising: computer readable program code configured to parse an input natural language query; computer readable program code configured to interpret the natural language query to an underlying order of one or more facets; computer readable program code configured to select one or more relevant combinations of facets in response to the natural language query; and computer readable program code configured to organize and output a display of one or more of the one or more relevant combinations of facets necessary to obtain one or more desired records corresponding to the natural language query.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 4 illustrates a natural language query interface according to an embodiment.

FIG. 6 illustrates facet selection interface options according to an embodiment.

DETAILED DESCRIPTION

Figure 1:
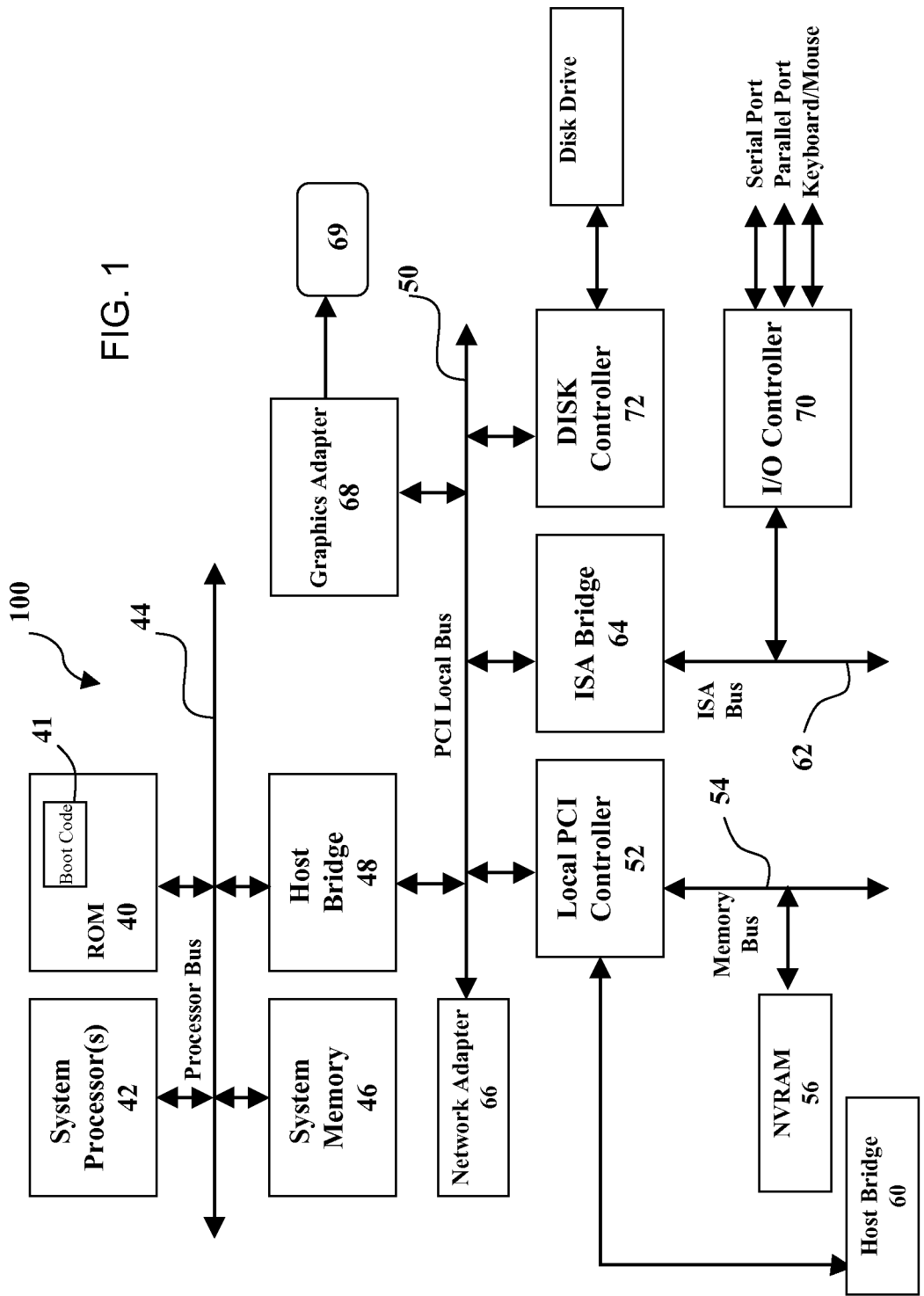
FIG. 1 illustrates a computer system according to an embodiment.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, et cetera. In other instances, well-known structures, materials, or operations are not shown or described in detail to avoid obscuring aspects of the invention.

The inventors have recognized that a difficulty common to conventional faceted search tools is that the user interaction is described at least in part by clicks (selection) and necessitates that the user click the right/correct preceding values to reach the desired facet(s) value, and also in the right order. Accordingly, embodiments of the invention address this problem and allow users to navigate to the facets with minimal interaction by just typing in a natural language query, which users are more accustomed to.

Thus, those having ordinary skill in the art will understand that the described embodiments of the invention broadly provide a faceted search tool supporting natural language queries. Embodiments of the invention enable entering a natural language query that contains representative terms the user wants to search for, and the facets which contain the searched values are resolved and presented to the user by the system.

Embodiments of the invention provide an interface for selecting a relevant facet combination, in case the same value is applicable to multiple facets. The query need not even specify which value is for which facet. The (system-suggested) order of the selected combination of facets is based on system heuristics and supervision. A search tool according to embodiments of the invention then provides automatic visualization of the facets in the correct order with the necessary selections of values, which are needed to drill down to the desired records. The resultant visualization not only shows the few records which are relevant to the typed query (as determined by the system), but also much more information such as information showing exactly how the original records were sliced by the system to reach these records.

Accordingly, using an embodiment of the invention, a user can simply enter a natural language query without specifying particular facets. A system implemented processing of the query narrows down to values to search for in the facets. Subsequently, the system resolves the facets that contain the values. An interface is provided for selecting a relevant facet combination, such as in a case where the same value is applicable to multiple facets. The system then provides an automatic visualization of the facets in the correct order with the necessary selections of values needed to drill down to the desired records. Again, the resultant visualization shows more information (for example, how the original records were sliced to reach these records), that is useful in the case that the user is curious as to how certain selections were made, et cetera.

A search tool according to embodiments of the invention are suitable for many contexts. Some non-limiting and exemplary target applications of faceted search tools consistent with the described embodiments of the invention include but are not limited to search for products in online shopping systems, service catalogs, semantic web searches, as well as any other general faceted search. Embodiments of the invention allow for increased efficiency of business analysts by saving their time to analyze a given set of data. Thus, it can be appreciated that embodiments of the invention provide, via a aesthetically pleasing and intuitive interface, help in identifying the insights that increase marketability of a product implementing a faceted search, that are otherwise not discoverable using a conventional faceted search tool.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, there is depicted a block diagram of an illustrative embodiment of a computer system 100. The illustrative embodiment depicted in FIG. 1 may be an electronic device such as a laptop or desktop personal computer, a mobile/smart phone or the like. As is apparent from the description, however, the embodiments of the invention may be implemented in any appropriately configured device, as described herein.

As shown in FIG. 1, computer system 100 includes at least one system processor 42, which is coupled to a Read-Only Memory (ROM) 40 and a system memory 46 by a processor bus 44. System processor 42, which may comprise one of the AMD line of processors produced by AMD Corporation or a processor produced by INTEL Corporation, is a general-purpose processor that executes boot code 41 stored within ROM 40 at power-on and thereafter processes data under the control of an operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to LAN, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a as a keyboard, mouse, serial and parallel ports, et cetera. A disk controller 72 connects a disk drive with PCI local bus 50. The USB Bus and USB Controller (not shown) are part of the Local PCI controller (52).

Figure 2:
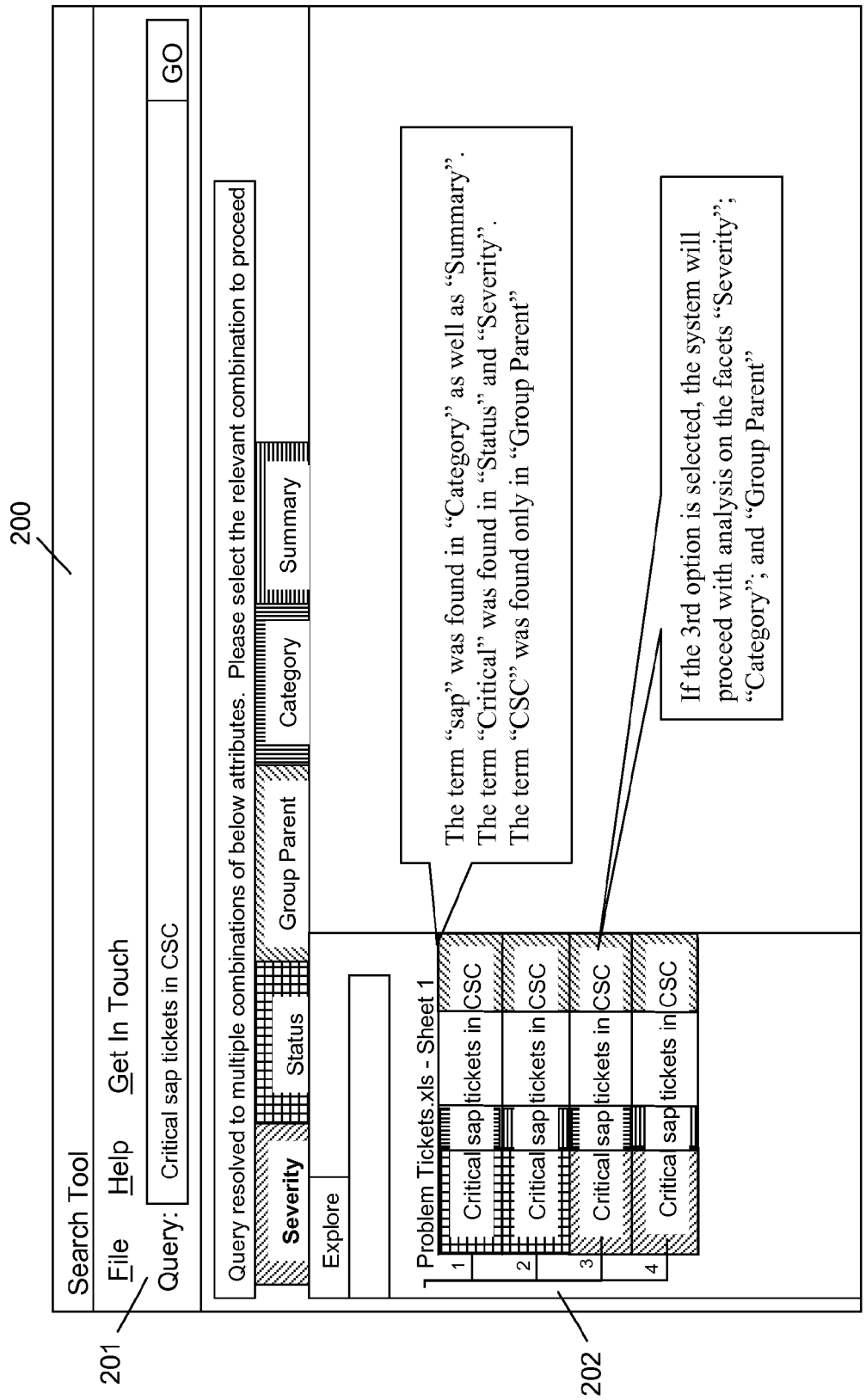
FIG. 2 illustrates a natural language query interface according to an embodiment.

Referring to FIG. 2, a non-limiting and exemplary natural language query user interface 200 according to an embodiment of the invention is illustrated. The user interface 200 is can be configured for display on a display device, such as display 69 of computer system 100 illustrated in FIG. 1. Indicated at 201 is a natural language query box. A user is enabled to type a natural language query (here, "Critical sap tickets in CSC") in the query box 201. The user enters a query that contains the representative terms to be searched for. In this example, the terms include "Critical", "sap", "ticket", "in", and "CSC". The query need not specify which value is for which facet.

Figure 3:
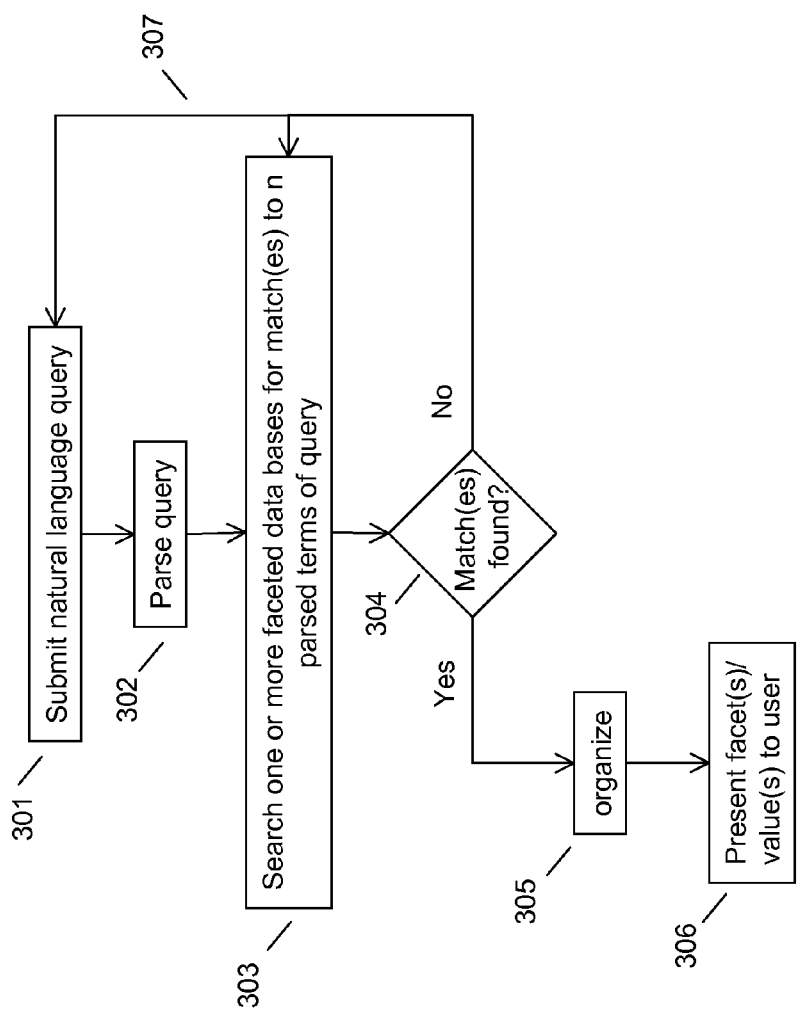
FIG. 3 illustrates natural language query and facet selection/organization according to an embodiment.

Query processing is handled automatically by the system. A non-limiting example of query processing is illustrated in FIG. 3. The user submits a natural language query at 301. The query is parsed at 302 for elimination of the stopwords and spelling mistakes and is then broken down into the n distinct terms and phrases. In the example used herein, the n distinct terms and phrases include "Critical", "sap", "ticket in", and "CSC". The backend (for example, appropriately configured computing system) of the interface has an index of all facets, each of which is queried at 303 for all the terms and phrases. Optimization can be implemented for example by using the type of values (numeric, date type, et cetera) to reduce the number of unnecessary index queries. At 304 it is determined what matches are found. These matches are organized 305 and output to the display at 306 for review by the user. If no match is found, another index can be queried or the user can refine the natural language query 307.

Referring back to FIG. 2, in a view 202 of the user interface 200, the attributes containing the searched values are presented in an organized way (here as "options" 1-4) for user selection. In FIG. 2 for example, four options are presented, with the search terms highlighted according to the attributes (here for example, "Severity", "Status", "Group Parent", "Category", and "Summary") found to contain the values as a result of the search.

Figure 4:
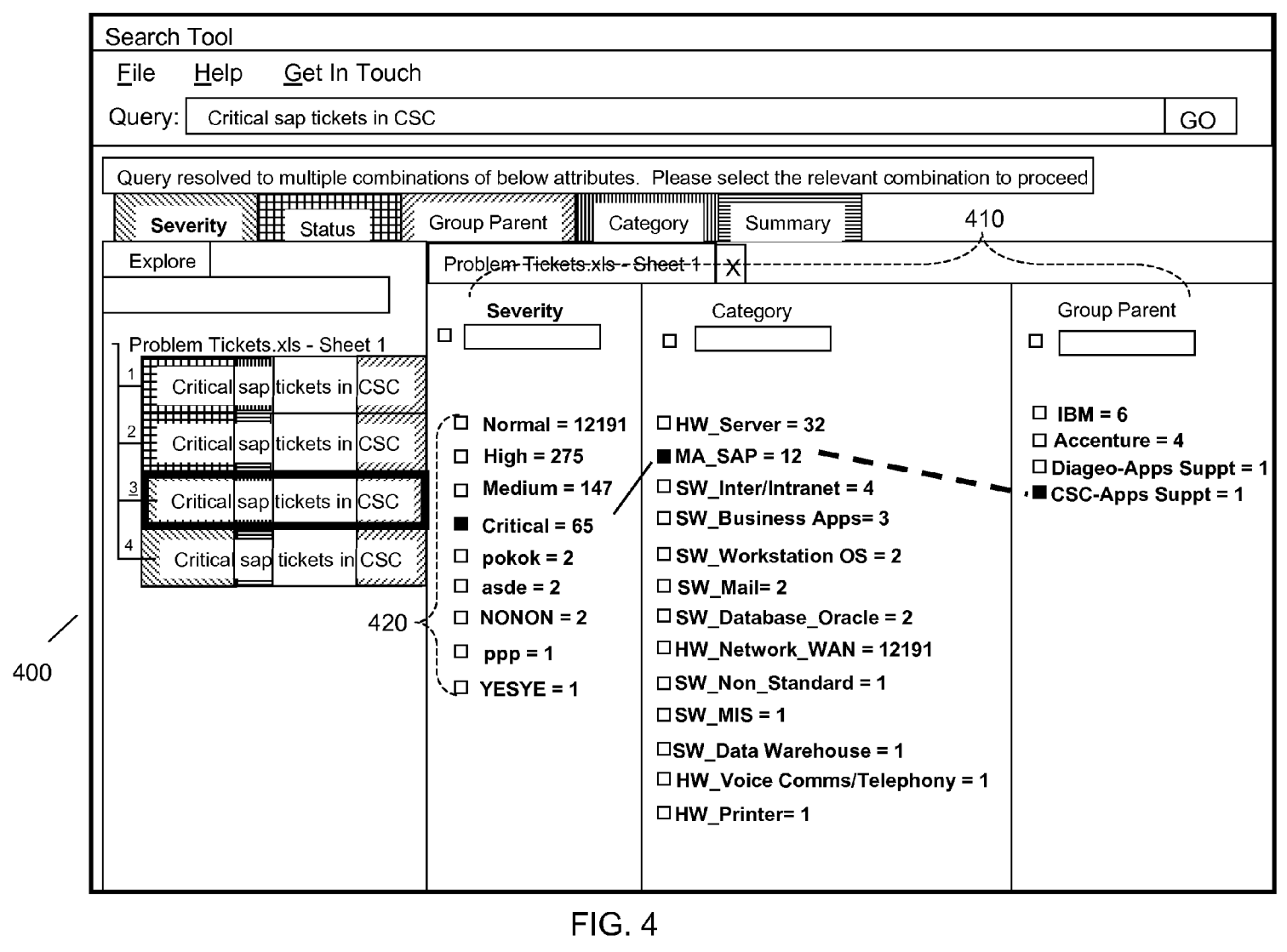

Assuming the user selects the third option, the system proceeds to analyze the facets contained in that option (here for example, "Severity", "Category", and "Group Parent") and presents them, as illustrated in FIG. 4. An embodiment of the invention provides for automatically resolving facets and orders of facets. As a non-limiting example, embodiments of the invention first resolve relevant facets. If a value is found in a facet, for example "Critical" found in "Severity" of option 3, it is considered for further processing. The same value may occur in multiple facets. Here for example, "sap" is found in both "Category" and "Summary" (compare options 3 and 4, respectively). Thus, embodiments of the invention are configured to allow the user to select one of the relevant combinations of facets. In response to selection, a view 410 is provided in the user interface 400 to the user which can be characterized as containing three columns corresponding to facets "Severity", "Category" and "Group Parent", automatically organized as discussed herein. Here, a user interface (UI) controller automatically selects the attribute containing the natural language search term, and also contains additional information regarding the attribute containing the search term 420.

Embodiments of the invention use heuristics to order the facets in view 410 in which the searched values were found. The facets may be ordered in a variety of ways. For example, as illustrated in 420, the system can determine that the order is the order in which the values occurred in the natural language query (that is, "Critical", "sap" and "CSC"). The selective application of facet selection is configurable, for example to retain the maximum number of records from the original data set (refer to FIG. 6 for an example consistent with this outcome—"Option 3"). Moreover, the order can be an order in which the attributes having maximum values occurring in the natural query are ahead of those with lesser values (that is, in 420, "Critical" appears before "sap" because "Critical"=65, whereas "sap"=12).

Figure 5:
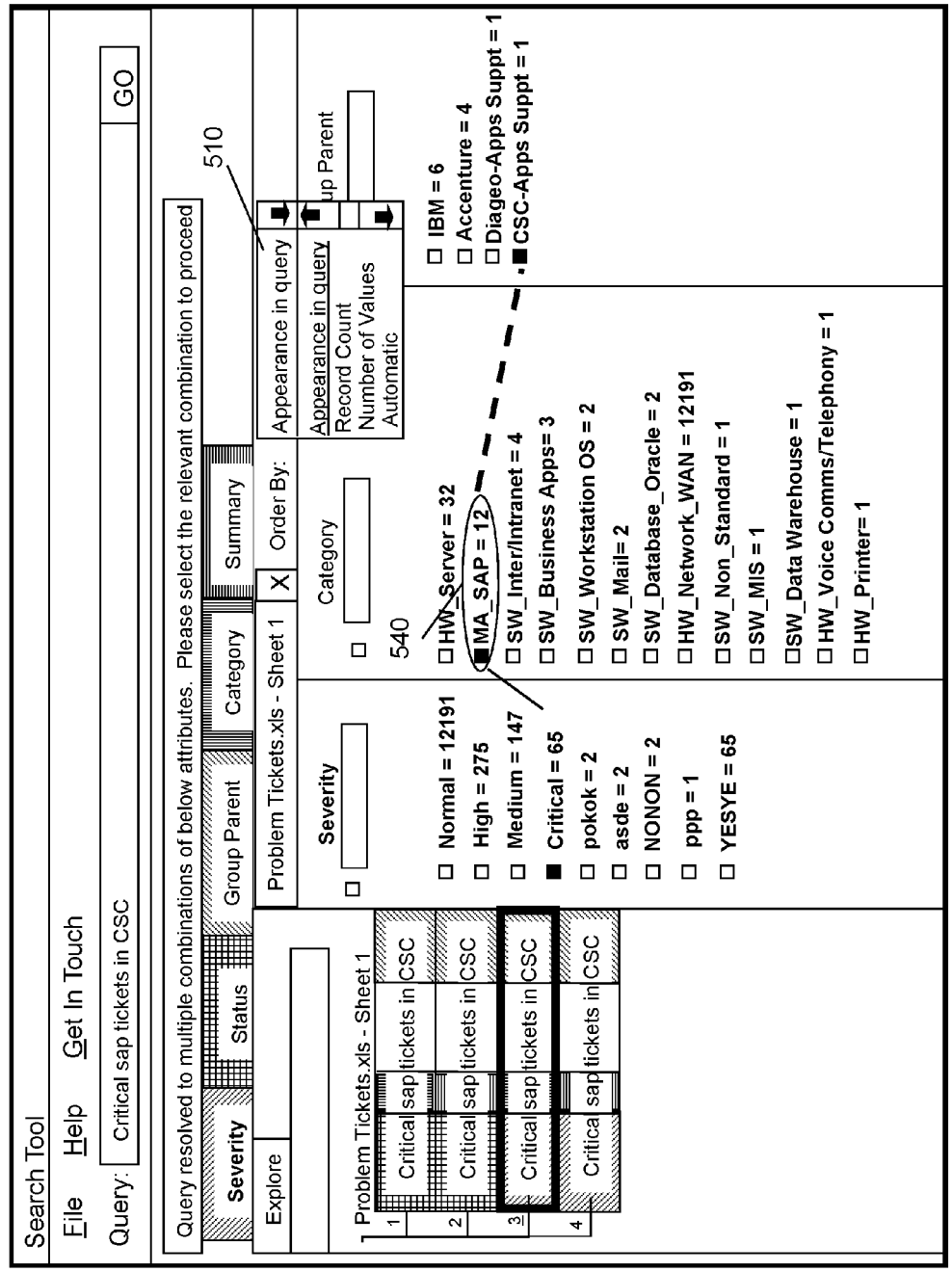
FIG. 5 illustrates a natural language query interface according to an embodiment.

In any event, the view of the user interface 500 can be modified to suit the particular user's purpose. For example, a combination of the above orderings can be employed. Moreover, the user may choose to reorder using an appropriate portion of the user interface 500, as illustrated at drop-down menu 510 in FIG. 5.

A default visualization is thus automatically produced in response to the natural language query input of the user, as illustrated in FIGS. 2 and 4-6. For example, once the order of the facets is determined, the facet at position zero is shown as the first facet (for example, "Severity" in FIG. 5 (in which option 3 has been selected)), along with the distribution of all its possible values. The value of the facet that occurs in the natural language query (here, "Critical") is then selected (checked) automatically by a UI controller, and the distribution of the next facet ("Category") is shown. If the distribution of the values for the next facet ("Category", in position 1) contains a value that also occurs in the natural language query, this is selected. For example, "Category" contains "sap", which was included in the natural language query input for this example (that is, "Critical sap tickets in CSC"). Thus, at 540, the UI controller automatically selects MA_SAP=12.

The user is enabled to drill down to the records in various ways given the user interface provided by embodiments of the invention. For example, illustrated in FIG. 6 are three options for ordering the facets automatically identified by a system according to an embodiment of the invention in response to a natural language query for "Critical sap tickets in CSC". As shown, the user can maximize the retention of records by choosing option 3, because organizing as "Category" "Group Parent" "Severity" retains 1161→21→1 records, whereas options 1 and 2 retain less records, as indicated. The user interface can further include a rating option or the like for enabling the user to save and store preferred orderings of facets for use in future searches.

In brief recapitulation, embodiments of the invention broadly contemplate systems, methods, apparatuses and program products providing a faceted search tool enabling a user to enter a natural language query that contains representative terms the user wants to search for, and the facets which contain the searched values are automatically resolved and presented to the user. Thus, embodiments of the invention provide for automated and assisted facet selection in response to a natural language query, facilitating more user friendly and accurate searches of faceted data.

It should be noted as well that aspects of the invention may be embodied as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. An apparatus comprising:
   one or more processors; and
   a non transitory computer readable storage medium having computer readable program code comprising a faceted search tool embodied therewith and executable by the one or more processors, the computer readable program code comprising:
   computer readable program code configured to parse an input natural language query into one or more terms;
   computer readable program code configured to query a parsing of facets for occurrences of the one or more terms;
   computer readable program code configured to provide a visual interface for displaying one or more relevant combinations of facets in response to the natural language query and for selecting one or more of the displayed one or more relevant combinations of facets;
   computer readable program code configured to, upon receiving a selection of the one or more relevant combinations of facets, output a display of an organization of facets comprising at least one unique ordering of facets which obtains one or more desired records corresponding to the natural language query;
   computer readable program code configured to visually code the one or more relevant combinations of facets in an options menu, wherein the code corresponds to one or more facets;
   computer readable program code configured to provide a visual interface for reorganizing the display of the one or more relevant combinations of facets, wherein the menu for reorganizing the display comprises options selected from the group consisting of: appearance in query; record count; number of values; automatic;
   wherein the visual interface is further configured to display a default organization of facets based on the order of occurrence of the one or more terms in the natural language query and to display one or more organizations of facets other than the default organization of facets in response to the user selection.

2. The apparatus according to claim 1, wherein the computer readable program code further comprises computer readable program code configured to rate one or more organizations of the facets.

3. The apparatus according to claim 2, wherein the apparatus is configured to store rated organizations of the facets in a memory for use in future searches.

4. The apparatus according to claim 1, wherein the computer readable program code further comprises computer readable program code configured to select one or more of the facets containing a value in the natural language query according to predetermined heuristics.

5. The apparatus according to claim 1, wherein the one or more relevant combinations of facets comprise two or more relevant combinations of facets configured to retain a different number of records based on automatic selection of the one or more facets.

6. The apparatus according to claim 1, wherein the computer readable program code configured to organize and output a display comprising at least one ordering of facets is configured to display one or more organizations of facets other than the default organization of facets in response to a user selection of two or more possible organizations of facets.

7. A method comprising:
   parsing an input natural language query into one or more terms utilizing a faceted search tool configured to:
      query a parsing of facets for occurrences of the one or more terms;
      provide a visual interface for displaying one or more relevant combinations of facets in response to the natural language query and for selecting one or more of the displayed one or more relevant combinations of facets;
      , upon receiving a selection of the one or more relevant combinations of facets, output a display of an organization of facets comprising at least one unique ordering of facets which obtains one or more desired records corresponding to the natural language query;
      wherein the providing of a visual interface comprises visually coding the one or more relevant combinations of facets in an options menu, wherein the code corresponds to one or more facets;
      wherein the visual interface comprises a menu for reorganizing the display of the one or more relevant combinations of facets, wherein the menu for reorganizing the display comprises options selected from the group consisting of: appearance in query; record count; number of values; automatic; and
      wherein the visual interface further comprises a display a default organization of facets based on the order of occurrence of the one or more terms in the natural language query and wherein the visual interface displays one or more organizations of facets other than the default organization of facets in response to the user selection.

8. The method according to claim 7, further comprising rating one or more organizations of the facets.

9. The method according to claim 8, further comprising storing rated organizations of the facets in a memory for use in future searches.

10. The method according to claim 7, further comprising selecting one or more facets a value in the natural language query according to predetermined heuristics.

11. The method according to claim 7, wherein the one or more relevant combinations of facets comprise two or more relevant combinations of facets configured to retain a different number of records based on automatic selection of values of the one or more facets.

12. The method according to claim 7, wherein the coding comprises color coding.

13. A computer program product comprising:
   a non-transitory computer readable storage medium having computer readable program code comprising a faceted search tool embodied therewith, the computer readable program code comprising:
      computer readable program code configured to parse an input natural language query into one or more terms;
      computer readable program code configured to query a parsing of facets for occurrences of the one or more terms;
      computer readable program code configured to provide a visual interface for displaying one or more relevant combinations of facets in response to the natural language query and for selecting one or more of the displayed one or more relevant combinations of facets;
      computer readable program code configured to, upon receiving a selection of the one or more relevant combinations of facets, output a display of an organization of facets comprising at least one unique ordering of facets which obtains one or more desired records corresponding to the natural language query;
      computer readable program code configured to visually code the one or more relevant combinations of facets in an options menu, wherein the code corresponds to one or more facets;
      computer readable program code configured to provide a visual interface for reorganizing the display of the one or more relevant combinations of facets, wherein the menu for reorganizing the display comprises options selected from the group consisting of: appearance in query; record count; number of values; automatic;
   wherein the visual interface is further configured to display a default organization of facets based on the order of occurrence of the one or more terms in the natural language query and to display one or more organizations of facets other than the default organization of facets in response to the user selection.

\* \* \* \* \*